(12) United States Patent
Wu et al.

(10) Patent No.: US 9,916,037 B2
(45) Date of Patent: Mar. 13, 2018

(54) METHOD AND SYSTEM FOR MOBILE DEVICE SPLASH MODE OPERATION AND TRANSITION THERETO

(71) Applicant: Rakuten Kobo, Inc., Toronto (CA)

(72) Inventors: James Wu, Newmarket (CA); Ramesh Mantha, Toronto (CA); Trevor Hunter, Toronto (CA); Robert Beghian, Toronto (CA)

(73) Assignee: Rakuten Kobo, Inc., Toronto (CA)

( * ) Notice: Subject to any disclaimer, the term of this patent is extended or adjusted under 35 U.S.C. 154(b) by 359 days.

(21) Appl. No.: 14/498,722

(22) Filed: Sep. 26, 2014

(65) Prior Publication Data

US 2016/0092025 A1   Mar. 31, 2016

(51) Int. Cl.
*G06F 3/01* (2006.01)
*G06F 3/041* (2006.01)
*G06F 3/0488* (2013.01)

(52) U.S. Cl.
CPC ............ *G06F 3/0418* (2013.01); *G06F 3/017* (2013.01); *G06F 3/0412* (2013.01); *G06F 3/04883* (2013.01)

(58) Field of Classification Search
CPC .... G06F 3/0418; G06F 3/017; G06F 3/04883; G06F 3/0412–3/0414; G06F 2203/04106; G06F 3/044; G06F 3/041–3/047
See application file for complete search history.

(56) References Cited

U.S. PATENT DOCUMENTS

| | | | | |
|---|---|---|---|---|
| 4,868,912 A | * | 9/1989 | Doering | G06F 3/0421 250/221 |
| 8,830,181 B1 | * | 9/2014 | Clark | G06F 3/04883 345/173 |
| 2012/0105367 A1 | * | 5/2012 | Son | G06F 3/0414 345/174 |

(Continued)

FOREIGN PATENT DOCUMENTS

| | | |
|---|---|---|
| JP | 2003-15779 A | 1/2003 |
| JP | 2013-222283 A | 10/2013 |
| WO | WO 2014/092038 A1 | 6/2014 |

OTHER PUBLICATIONS

International Search Report and Written Opinion of the International Searching Authority dated Dec. 15, 2015 in PCT/JP2015/004913.

*Primary Examiner* — Jennifer To
*Assistant Examiner* — Liang Li
(74) *Attorney, Agent, or Firm* — Oblon, McClelland, Maier & Neustadt, L.L.P.

(57) ABSTRACT

A computing device includes a housing and a display assembly having a screen. The housing at least partially circumvents the screen so that the screen is viewable and a set of touch sensors are provided with the display assembly. A processor is provided within the housing to detect a gesture via the set of touch sensors, and to interpret the gesture as one of a plurality of user inputs. The processor further detects a presence of extraneous objects on a surface the screen of the display assembly, and adjusts one or more settings of the computing device in response to detecting the presence of extraneous objects. For example, the processor may adjust the one or more settings by reconfiguring a set of actions to be performed in response to the plurality of user inputs.

20 Claims, 6 Drawing Sheets

(56) References Cited

U.S. PATENT DOCUMENTS

| | | | |
|---|---|---|---|
| 2012/0127107 A1* | 5/2012 | Miyashita | G06F 3/04883 345/173 |
| 2012/0146924 A1* | 6/2012 | Inoue | G06F 3/0418 345/173 |
| 2013/0201160 A1 | 8/2013 | Ito et al. | |
| 2014/0146070 A1 | 5/2014 | Liu et al. | |
| 2015/0268786 A1 | 9/2015 | Kitada | |
| 2015/0370387 A1* | 12/2015 | Yamaguchi | G06F 3/047 345/174 |
| 2016/0062533 A1* | 3/2016 | O'Connor | G06F 3/0416 345/173 |
| 2017/0052625 A1* | 2/2017 | Bryant | G06F 3/0418 |

\* cited by examiner

METHOD AND SYSTEM FOR MOBILE DEVICE SPLASH MODE OPERATION AND TRANSITION THERETO

TECHNICAL FIELD

Examples described herein relate to a computing device that is operable when water and/or other extraneous objects are present on the surface of a display screen of the computing device.

BACKGROUND

An electronic personal display is a mobile computing device that displays information to a user. While an electronic personal display may be capable of many of the functions of a personal computer, a user can typically interact directly with an electronic personal display without the use of a keyboard that is separate from or coupled to but distinct from the electronic personal display itself. Some examples of electronic personal displays include mobile digital devices/tablet computers such (e.g., Apple iPad®, Microsoft® Surface™, Samsung Galaxy Tab® and the like), handheld multimedia smartphones (e.g., Apple iPhone®, Samsung Galaxy S®, and the like), and handheld electronic readers (e.g., Amazon Kindle®, Barnes and Noble Nook®, Kobo Aura HD, and the like).

Some electronic personal display devices are purpose built devices that are designed to perform especially well at displaying readable content. For example, a purpose built purpose build device may include a display that reduces glare, performs well in high lighting conditions, and/or mimics the look of text on actual paper. While such purpose built devices may excel at displaying content for a user to read, they may also perform other functions, such as displaying images, emitting audio, recording audio, and web surfing, among others.

There also exists numerous kinds of consumer devices that can receive services and resources from a network service. Such devices can operate applications or provide other functionality that links a device to a particular account of a specific service. For example, e-reader devices typically link to an online bookstore, and media playback devices often include applications which enable the user to access an online media library. In this context, the user accounts can enable the user to receive the full benefit and functionality of the device.

DETAILED DESCRIPTION

Figure 1:
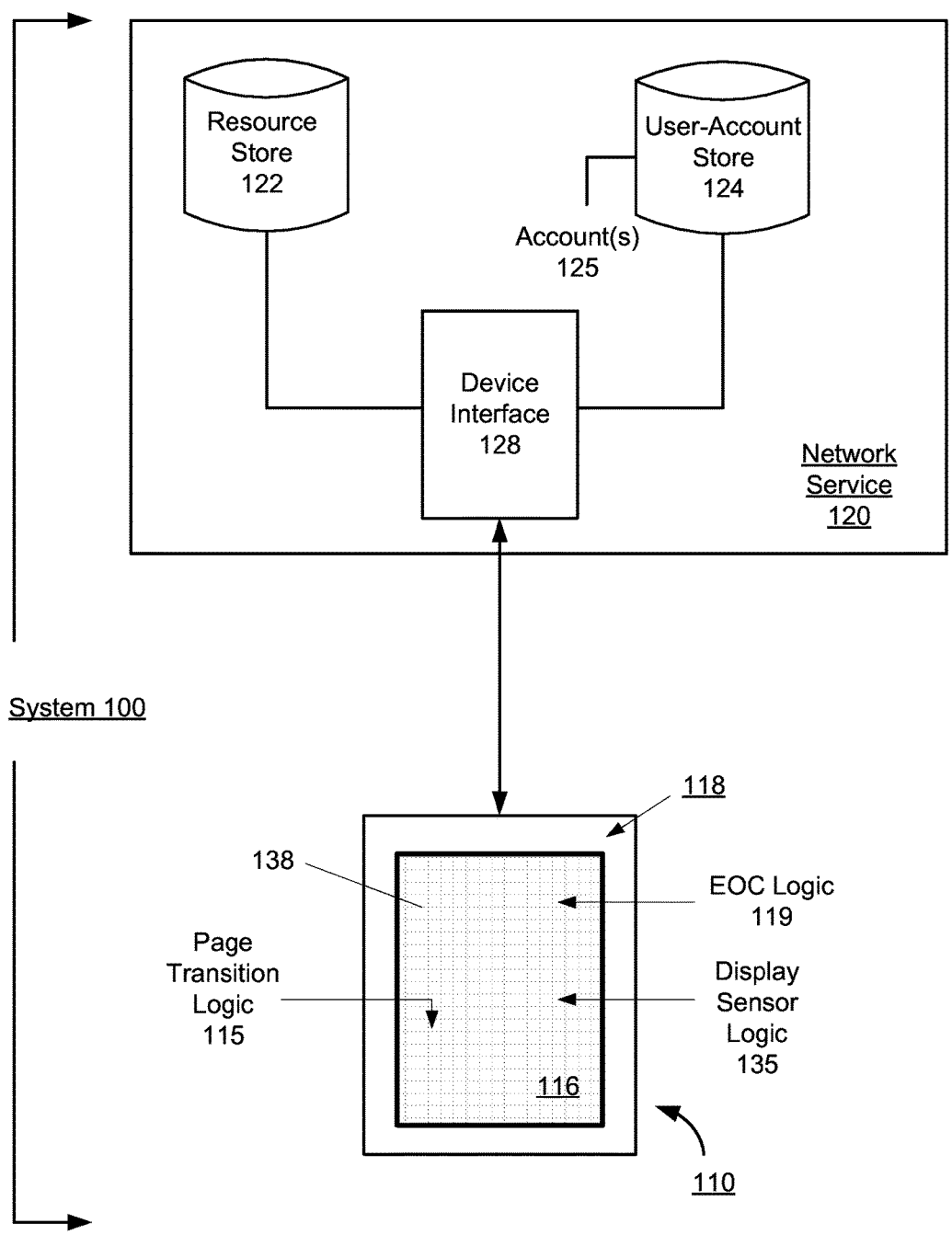
FIG. 1 illustrates a system for utilizing applications and providing e-book services on a computing device, according to an embodiment.

Embodiments described herein provide for a computing device that is operable even when water and/or other persistent objects are present on the surface of a display of the computing device. More specifically, the computing device may detect a presence of extraneous objects (e.g., such as water, dirt, or debris) on a surface of the display screen, and perform one or more operations to mitigate or overcome the presence of such extraneous objects in order to maintain a functionality and/or viewability of content appearing on the display screen. For example, upon detecting the presence of one or more extraneous objects, the computing device may operate in a secondary mode (e.g., a "splash mode") wherein one or more device settings and/or configurations (e.g., recognized gestures, supported inputs, and/or input responses) are modified.

A computing device includes a housing and a display assembly having a screen. The housing at least partially circumvents the screen so that the screen is viewable and a set of touch sensors are provided with the display assembly. A processor is provided within the housing to detect a gesture via the set of touch sensors, and to interpret the gesture as one of a plurality of user inputs. The processor further detects a presence of extraneous objects on a surface the screen of the display assembly, and adjusts one or more settings of the computing device in response to detecting the presence of extraneous objects.

For some embodiments, upon detecting the presence of extraneous objects the processor may reconfigure a set of actions to be performed in response to the plurality of user inputs. For other embodiments, the processor may reconfigure the plurality of user inputs such that the processor is responsive to only a subset of user inputs of the plurality of user inputs. For example, the subset of user inputs may consist only of page-turn inputs.

Further, for some embodiments, upon detecting the presence of extraneous objects the processor may reconfigure a set of gestures recognized by the computing device. For example, the processor may associate at least one of the plurality of user inputs with a new gesture. Alternatively, and/or in addition, the processor may disassociate at least one of the plurality of user inputs with a known gesture. In some embodiments, the known gesture may correspond with tapping and holding the screen of the display and/or swiping the screen of the display.

Still further, for some embodiments, the processor may determine a contact pressure associated with the detected gesture and compare the contact pressure with a pressure threshold. For example, the contact pressure corresponds with an amount of force applied to a surface of the screen of the display. Thus, after detecting the presence of extraneous objects the processor may interpret the received gesture as one of the plurality of user inputs if the correspond contact pressure exceeds the pressure threshold.

Among other benefits, examples described herein enable a personal display device, such as an e-reading device, to adjust one or more device settings upon detecting the presence of water and/or other extraneous objects on a display surface. The presence of water, dirt, debris, and/or other extraneous (e.g., undesired) objects on the surface of a display screen of an e-reading device may inhibit or otherwise impede one or more functions of the device. For example, the extraneous objects may be falsely interpreted as a user "touch" input by one or more touch sensors provided with the display. This may cause the computing device to malfunction (e.g., perform undesired actions) and/or prevent the device from responding to actual (e.g., desired) user inputs. Therefore, the e-reading device may adjust one or more device settings, in response to detecting the presence of one or more extraneous objects, in order to prevent the device from malfunctioning and/or to enable a user to continue operating the device in a safe and/or optimized manner.

"E-books" are a form of electronic publication that can be viewed on computing device with suitable functionality. An e-book can correspond to a literary work having a pagination format, such as provided by literary works (e.g., novels) and periodicals (e.g., magazines, comic books, journals, etc.). Optionally, some e-books may have chapter designations, as well as content that corresponds to graphics or images (e.g., such as in the case of magazines or comic books). Multi-function devices, such as cellular-telephony or messaging devices, can utilize specialized applications (e.g., e-reading apps) to view e-books. Still further, some devices (sometimes labeled as "e-readers") can be centric towards content viewing, and e-book viewing in particular.

An "e-reading device" can refer to any computing device that can display or otherwise render an e-book. By way of example, an e-reading device can include a mobile computing device on which an e-reading application can be executed to render content that includes e-books (e.g., comic books, magazines, etc.). Such mobile computing devices can include, for example, a multi-functional computing device for cellular telephony/messaging (e.g., feature phone or smart phone), a tablet device, an ultramobile computing device, or a wearable computing device with a form factor of a wearable accessory device (e.g., smart watch or bracelet, glasswear integrated with a computing device, etc.). As another example, an e-reading device can include an e-reading device, such as a purpose-built device that is optimized for an e-reading experience (e.g., with E-ink displays).

One or more embodiments described herein provide that methods, techniques and actions performed by a computing device are performed programmatically, or as a computer-implemented method. Programmatically means through the use of code or computer-executable instructions. A programmatically performed step may or may not be automatic.

One or more embodiments described herein may be implemented using programmatic modules or components. A programmatic module or component may include a program, a subroutine, a portion of a program, or a software or a hardware component capable of performing one or more stated tasks or functions. As used herein, a module or component can exist on a hardware component independently of other modules or components. Alternatively, a module or component can be a shared element or process of other modules, programs or machines.

Furthermore, one or more embodiments described herein may be implemented through instructions that are executable by one or more processors. These instructions may be carried on a computer-readable medium. Machines shown or described with figures below provide examples of processing resources and computer-readable mediums on which instructions for implementing embodiments of the invention can be carried and/or executed. In particular, the numerous machines shown with embodiments of the invention include processor(s) and various forms of memory for holding data and instructions. Examples of computer-readable mediums include permanent memory storage devices, such as hard drives on personal computers or servers. Other examples of computer storage mediums include portable storage units, such as CD or DVD units, flash or solid state memory (such as carried on many cell phones and consumer electronic devices) and magnetic memory. Computers, terminals, network enabled devices (e.g., mobile devices such as cell phones) are all examples of machines and devices that utilize processors, memory, and instructions stored on computer-readable mediums. Additionally, embodiments may be implemented in the form of computer programs, or a computer usable carrier medium capable of carrying such a program.

System Description

FIG. 1 illustrates a system 100 for utilizing applications and providing e-book services on a computing device, according to an embodiment. In an example of FIG. 1, system 100 includes an electronic display device, shown by way of example as an e-reading device 110, and a network service 120. The network service 120 can include multiple servers and other computing resources that provide various services in connection with one or more applications that are installed on the e-reading device 110. By way of example, in one implementation, the network service 120 can provide e-book services which communicate with the e-reading device 110. The e-book services provided through network service 120 can, for example, include services in which e-books are sold, shared, downloaded and/or stored. More generally, the network service 120 can provide various other content services, including content rendering services (e.g., streaming media) or other network-application environments or services.

The e-reading device 110 can correspond to any electronic personal display device on which applications and application resources (e.g., e-books, media files, documents) can be rendered and consumed. For example, the e-reading device 110 can correspond to a tablet or a telephony/messaging device (e.g., smart phone). In one implementation, for example, e-reading device 110 can run an e-reader application that links the device to the network service 120 and enables e-books provided through the service to be viewed and consumed. In another implementation, the e-reading device 110 can run a media playback or streaming application that receives files or streaming data from the network service 120. By way of example, the e-reading device 110 can be equipped with hardware and software to optimize certain application activities, such as reading electronic content (e.g., e-books). For example, the e-reading device 110 can have a tablet-like form factor, although variations are possible. In some cases, the e-reading device 110 can also have an E-ink display.

In additional detail, the network service 120 can include a device interface 128, a resource store 122 and a user account store 124. The user account store 124 can associate the e-reading device 110 with a user and with an account 125. The account 125 can also be associated with one or more application resources (e.g., e-books), which can be stored in the resource store 122. The device interface 128 can handle requests from the e-reading device 110, and further interface the requests of the device with services and functionality of the network service 120. The device interface 128 can utilize information provided with a user account 125 in order to enable services, such as purchasing downloads or determining what e-books and content items are associated with the user device. Additionally, the device interface 128 can provide the e-reading device 110 with access to the content store 122, which can include, for example, an online store. The device interface 128 can handle input to identify content items (e.g., e-books), and further to link content items to the account 125 of the user.

As described further, the user account store 124 can retain metadata for individual accounts 125 to identify resources that have been purchased or made available for consumption for a given account. The e-reading device 110 may be associated with the user account 125, and multiple devices may be associated with the same account. As described in greater detail below, the e-reading device 110 can store resources (e.g., e-books) that are purchased or otherwise made available to the user of the e-reading device 110, as well as to archive e-books and other digital content items that have been purchased for the user account 125, but are not stored on the particular computing device.

With reference to an example of FIG. 1, e-reading device 110 can include a display screen 116 and a housing 118. In an embodiment, the display screen 116 is touch-sensitive, to process touch inputs including gestures (e.g., swipes). For example, the display screen 116 may be integrated with one or more touch sensors 138 to provide a touch sensing region on a surface of the display screen 116. For some embodiments, the one or more touch sensors 138 may include capacitive sensors that can sense or detect a human body's capacitance as input. In the example of FIG. 1, the touch sensing region coincides with a substantial surface area, if not all, of the display screen 116. Additionally, the housing 118 can also be integrated with touch sensors to provide one or more touch sensing regions, for example, on the bezel and/or back surface of the housing 118.

According to some embodiments, the e-reading device 110 includes display sensor logic 135 to detect and interpret user input made through interaction with the touch sensors 138. By way of example, the display sensor logic 135 can detect a user making contact with the touch sensing region of the display screen 116. More specifically, the display sensor logic 135 can detect taps, multiple taps, and/or gestures made through user interaction with the touch sensing region of the display screen 116. Furthermore, the display sensor logic 135 can interpret such interactions in a variety of ways. For example, each interaction may be interpreted as a particular type of user input corresponding with a change in state of the display 116.

For some embodiments, the display sensor logic 135 may further detect the presence of water, dirt, debris, and/or other extraneous objects on the surface of the display 116. For example, the display sensor logic 135 may be integrated with a water-sensitive switch (e.g., such as an optical rain sensor) to detect an accumulation of water on the surface of the display 116. In a particular embodiment, the display sensor logic 135 may interpret simultaneous contact with multiple touch sensors 138 as a type of non-user input. For example, the multi-sensor contact may be provided, in part, by water and/or other unwanted or extraneous objects (e.g., dirt, debris, etc.) interacting with the touch sensors 138. Specifically, the e-reading device 110 may then determine, based on the multi-sensor contact, that at least a portion of the multi-sensor contact is attributable to water and/or other extraneous objects.

For some embodiments, the e-reading device 110 further includes extraneous object configuration (EOC) logic 119 to adjust one or more settings of the e-reading device 110 to account for the presence of water and/or other extraneous objects being in contact with the display screen 116. For example, upon detecting the presence of water and/or other extraneous objects on the surface of the display screen 116, the EOC logic 119 may power off the e-reading device 110 to prevent malfunctioning and/or damage to the device 110. For some embodiments, the EOC logic 119 may reconfigure the e-reading device 110 to respond (e.g., and/or not respond) to particular types of user interactions (e.g., gestures) that are subsequently detected via the touch sensors 138. This enables a user to continue operating the e-reading device 110 even with the water and/or other extraneous objects present on the surface of the display screen 116.

In some embodiments, the e-reading device 110 includes features for providing functionality related to displaying paginated content. The e-reading device 110 can include page transitioning logic 115, which enables the user to transition through paginated content. The e-reading device 110 can display pages from e-books, and enable the user to transition from one page state to another. In particular, an e-book can provide content that is rendered sequentially in pages, and the e-book can display page states in the form of single pages, multiple pages or portions thereof. Accordingly, a given page state can coincide with, for example, a single page, or two or more pages displayed at once. The page transitioning logic 115 can operate to enable the user to transition from a given page state to another page state. In some implementations, the page transitioning logic 115 enables single page transitions, chapter transitions, or cluster transitions (multiple pages at one time).

The page transitioning logic 115 can be responsive to various kinds of interfaces and actions in order to enable page transitioning. In one implementation, the user can signal a page transition event to transition page states by, for example, interacting with the touch sensing region of the display screen 116. For example, the user may swipe the surface of the display screen 116 in a particular direction (e.g., up, down, left, or right) to indicate a sequential direction of a page transition. In variations, the user can specify different kinds of page transitioning input (e.g., single page turns, multiple page turns, chapter turns, etc.) through different kinds of input. Additionally, the page turn input of the user can be provided with a magnitude to indicate a magnitude (e.g., number of pages) in the transition of the page state. For example, a user can touch and hold the surface of the display screen 116 in order to cause a cluster or chapter page state transition, while a tap in the same region can effect a single page state transition (e.g., from one page to the next in sequence). In another example, a user can specify page turns of different kinds or magnitudes through single taps, sequenced taps or patterned taps on the touch sensing region of the display screen 116.

Hardware Description

Figure 2:
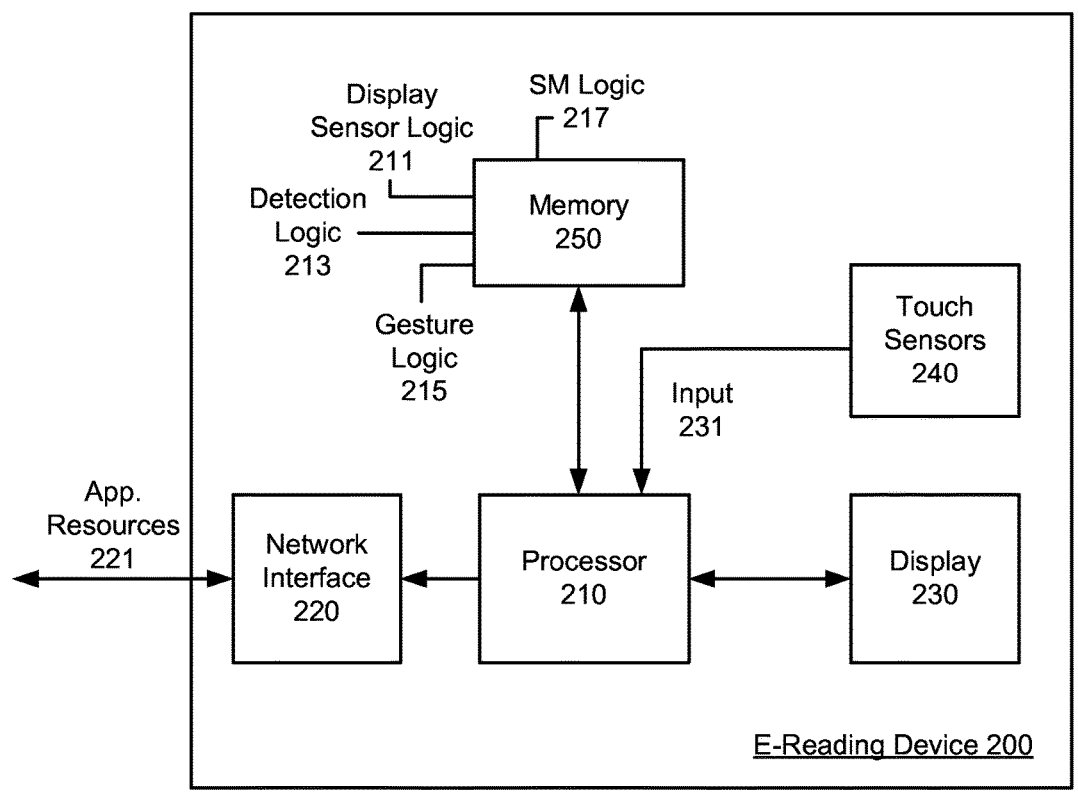
FIG. 2 illustrates an example of an e-reading device or other electronic personal display device, for use with one or more embodiments described herein.

FIG. 2 illustrates an example of an e-reading device 200 or other electronic personal display device, for use with one or more embodiments described herein. In an example of FIG. 2, an e-reading device 200 can correspond to, for example, the device 110 as described above with respect to FIG. 1. With reference to FIG. 2, e-reading device 200 includes a processor 210, a network interface 220, a display 230, one or more touch sensor components 240, and a memory 250.

The processor 210 can implement functionality using instructions stored in the memory 250. Additionally, in some implementations, the processor 210 utilizes the network interface 220 to communicate with the network service 120 (see FIG. 1). More specifically, the e-reading device 200 can access the network service 120 to receive various kinds of resources (e.g., digital content items such as e-books, configuration files, account information), as well as to provide information (e.g., user account information, service requests etc.). For example, e-reading device 200 can receive application resources 221, such as e-books or media files, that the user elects to purchase or otherwise download from the network service 120. The application resources 221 that are downloaded onto the e-reading device 200 can be stored in the memory 250.

In some implementations, the display 230 can correspond to, for example, a liquid crystal display (LCD) or light emitting diode (LED) display that illuminates in order to provide content generated from processor 210. In some implementations, the display 230 can be touch-sensitive. For example, in some embodiments, one or more of the touch sensor components 240 may be integrated with the display 230. In other embodiments, the touch sensor components 240 may be provided (e.g., as a layer) above or below the display 230 such that individual touch sensor components 240 track different regions of the display 230. Further, in some variations, the display 230 can correspond to an electronic paper type display, which mimics conventional paper in the manner in which content is displayed. Examples of such display technologies include electrophoretic displays, electrowetting displays, and electrofluidic displays.

The processor 210 can receive input from various sources, including the touch sensor components 240, the display 230, and/or other input mechanisms (e.g., buttons, keyboard, mouse, microphone, etc.). With reference to examples described herein, the processor 210 can respond to input 231 from the touch sensor components 240. In some embodiments, the processor 210 responds to inputs 231 from the touch sensor components 240 in order to facilitate or enhance e-book activities such as generating e-book content on the display 230, performing page transitions of the e-book content, powering off the device 200 and/or display 230, activating a screen saver, launching or closing an application, and/or otherwise altering a state of the display 230.

In some embodiments, the memory 250 may store display sensor logic 211 that monitors for user interactions detected through the touch sensor components 240, and further processes the user interactions as a particular input or type of input. In an alternative embodiment, the display sensor logic 211 may be integrated with the touch sensor components 240. For example, the touch sensor components 240 can be provided as a modular component that includes integrated circuits or other hardware logic, and such resources can provide some or all of the display sensor logic 211 (see also display sensor logic 135 of FIG. 1). For example, integrated circuits of the touch sensor components 240 can monitor for touch input and/or process the touch input as being of a particular kind. In variations, some or all of the display sensor logic 211 may be implemented with the processor 210 (which utilizes instructions stored in the memory 250), or with an alternative processing resource.

For some embodiments, the display sensor logic 211 may detect the presence of water and/or other extraneous objects on the surface of the display 230. For example, the display sensor logic 211 may determine that extraneous objects are present on the surface of the display 230 based on a number of touch-based interactions detected via the touch sensors 240 and/or a contact duration (e.g., a length of time for which contact is maintained with a corresponding touch sensor 240) associated with each interaction. More specifically, the display sensor logic 211 may detect the presence of water and/or other extraneous objects if a detected interaction falls outside a set of known gestures (e.g., gestures that are recognized by the e-reading device 200). Such embodiments are discussed in greater detail, for example, in co-pending U.S. patent application Ser. No. 14/498,661, titled "Method and System for Sensing Water, Debris or Other Extraneous Objects on a Display Screen," filed Sep. 26, 2014, which is hereby incorporated by reference in its entirety.

In one implementation, the display sensor logic 211 includes detection logic 213 and gesture logic 215. The detection logic 213 implements operations to monitor for the user contacting a surface of the display 230 coinciding with a placement of one or more touch sensor components 240. The gesture logic 215 detects and correlates a particular gesture (e.g., pinching, swiping, tapping, etc.) as a particular type of input or user action. The gesture logic 215 may also detect directionality so as to distinguish between, for example, leftward or rightward swipes.

For some embodiments, the display sensor logic 211 further includes splash mode (SM) logic 217 for adjusting one or more settings of the e-reading device 200 in response to detecting the presence of water and/or other extraneous objects on the surface of the display 230. For example, the splash mode logic 217 may configure the e-reading device 200 to operate in a "splash mode" when water and/or other extraneous objects are present (e.g., "splashed") on the surface of the display 230. While operating in splash mode, one or more device configurations may be altered or reconfigured to enable the e-reading device 200 to be continuously operable even while water and/or other extraneous objects are present on the surface of the display 230. More specifically, the splash mode logic 217 may perform one or more operations to mitigate or overcome the presence of extraneous objects (e.g., such as water) on the surface of the display 230. Accordingly, the splash mode logic 217 may be activated by the display sensor logic 211 upon detecting the presence of extraneous objects on the surface of the display 230.

For some embodiments, the splash mode logic 217 may reconfigure one or more actions (e.g., input responses) that are to be performed by the e-reading device 200 in response to user inputs. For example, the splash mode logic 217 may disable certain actions (e.g., such as performing multi-page and/or chapter transitions) that are triggered by multi-contact user interactions (e.g., requiring concurrent contact at multiple distinct locations on the display 230) and/or persistent user interactions (e.g., requiring continuous contact with the touch sensors 240 over a given duration) because such interactions could be misinterpreted by the gesture logic 215 given the presence of extraneous objects on the surface of the display 230. More specifically, while operating in splash mode, the e-reading device 200 may be able to perform only a limited subset of actions that the device 200 would otherwise be able to perform (e.g., when operating in a "normal mode"). In a particular implementation, the functionality of the e-reading device 200 may be limited to performing page-turning actions (e.g., regardless of the received user input). For example, multi-page and/or chapter transition inputs may all be interpreted by the splash mode logic 217 as single page-turn inputs.

Additionally, and/or alternatively, the splash mode logic 217 may enable a new set of actions to be performed by the e-reading device 200. For example, the splash mode logic 217 may remap one or more user inputs (and/or gestures) to the new set of actions. The new set of actions may include actions to be performed by the e-reading device 200 only when water and/or other extraneous objects are present on the surface of the display 230 (e.g., such as notifying the user to clean or wipe off the display 230). More specifically, the new set of actions may enable the e-reading device 200 to operate in an optimized manner while the water and/or other extraneous objects are present.

Further, for some embodiments, the splash mode logic 217 may reconfigure the set of inputs that can be processed by the e-reading device 200. For example, the splash mode logic 217 may disable certain user inputs (e.g., multi-page and/or chapter transition inputs) that correspond with multi-contact and/or persistent user interactions and could therefore be misinterpreted by the gesture logic 215 given the presence of extraneous objects on the surface of the display 230. More specifically, while operating in splash mode, the e-reading device 200 may respond to only a subset of inputs that the device 200 would otherwise be responsive to (e.g., when operating in the normal mode). In a particular implementation, the splash mode logic 217 may respond only to page-turn inputs. For example, inputs corresponding to multi-page and/or chapter transitions may elicit no response from the e-reading device 200 when operating in splash mode.

Still further, for some embodiments, the splash mode logic 217 may reconfigure a set of gestures that are recognizable by the e-reading device 200. For example, the splash mode logic 217 may disable certain gestures (e.g., gestures involving multi-contact and/or persistent user interactions) that could be misinterpreted by the gesture logic 215 given the presence of extraneous objects on the surface of the display 230. More specifically, while operating in splash mode, the e-reading device 200 may recognize only a subset of gestures that the device 200 would otherwise be able to recognize (e.g., when operating in the normal mode). In a particular implementation, the splash mode logic 217 may only recognize gestures corresponding with a single tap. For example, tap-and-hold gestures and/or swiping gestures may elicit no response from the e-reading device 200 when operating in splash mode. More specifically, the splash mode logic 217 may recognize a tapping gesture only upon detecting a contact release or finger liftoff (e.g., as opposed to detecting the initial contact). This may help ensure that the contact or interaction being detected is in fact a tapping gesture and not another extraneous object coming into contact with the surface of the display 230.

For other embodiments, the splash mode logic 217 may process a user input only if a contact pressure associated with the corresponding user interaction (e.g., gesture) exceeds a pressure threshold. For example, the touch sensors 240 may be pressure-sensitive, and may thus detect the amount of force applied by an object while in contact with the surface of the display 230. The magnitude of that force (e.g., the contact pressure) may be associated with each input 231 sent to the processor 210. Accordingly, the processor 210, in executing the splash mode logic 217, may selectively process the inputs 231 based on the contact pressure associated with each input 231. For example, the contact pressure associated with water, dirt, debris, and/or other extraneous objects may be substantially smaller than the contact pressure that can be applied through human interaction. Thus, in order to distinguish intentional user interactions from contact by extraneous objects, the splash mode logic 217 may process a particular input 231 only if the contact pressure associated with that input exceeds a particular pressure threshold.

Splash Mode Gesture Detection

Figure 3:
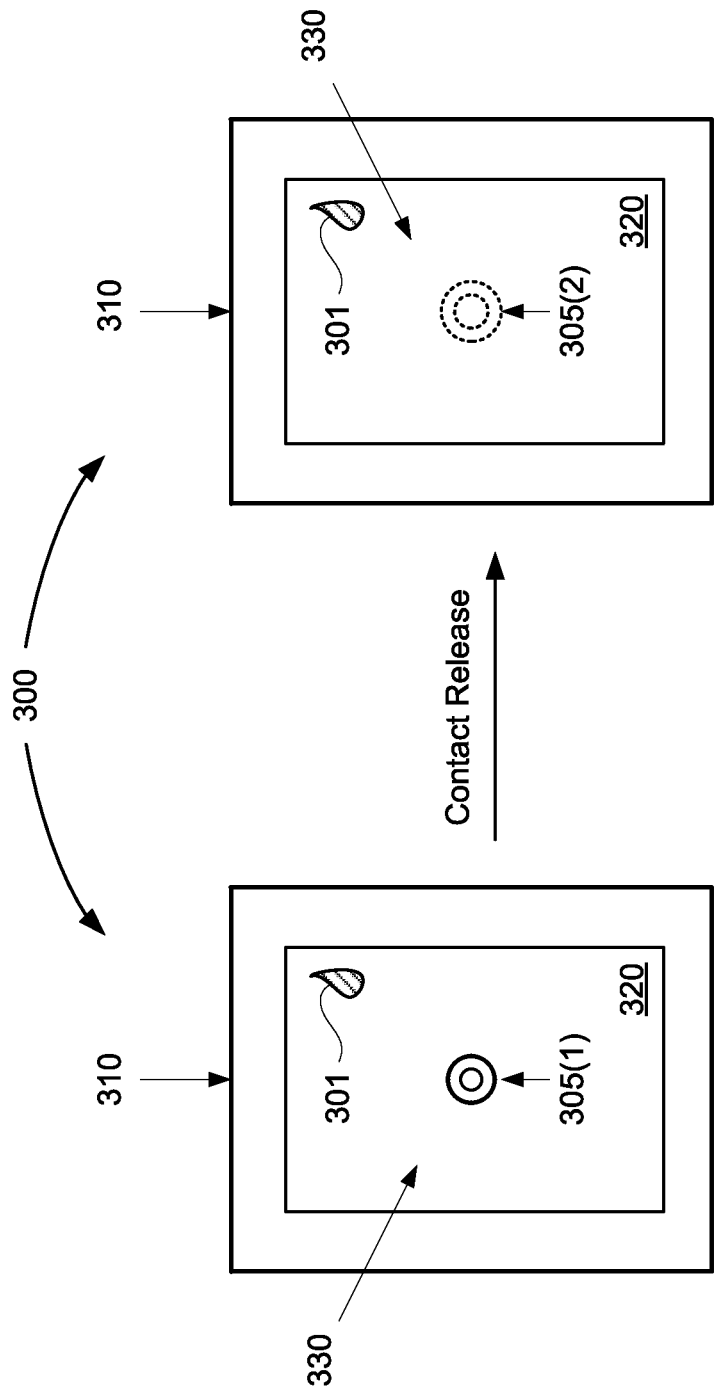
FIGS. 3A-3B illustrate embodiments of an e-reading device operable in a splash mode when water and/or other extraneous objects are present on the display, in accordance with some embodiments.

FIGS. 3A-3B illustrate embodiments of an e-reading device operable in a splash mode when water and/or other extraneous objects are present on the display, in accordance with some embodiments. The e-reading device 300 includes a housing 310 and a display screen 320. The e-reading device 300 can be substantially tabular or rectangular, so as to have a front surface that is substantially occupied by the display screen 320 so as to enhance content viewing. More specifically, the front surface of the housing 310 may be in the shape of a bezel surrounding the display screen 320. The display screen 320 can be part of a display assembly, and can be touch sensitive. For example, the display screen 320 can be provided as a component of a modular display assembly that is touch-sensitive and integrated with housing 310 during a manufacturing and assembly process.

A touch sensing region 330 is provided with at least a portion of the display screen 320. Specifically, the touch sensing region 330 may coincide with the integration of touch-sensors with the display screen 320. For some embodiments, the touch sensing region 330 may substantially encompass a surface of the display screen 320. Further, the e-reading device 300 can integrate one or more types of touch-sensitive technologies in order to provide touch-sensitivity on the touch sensing region 330 of the display screen 320. It should be appreciated that a variety of well-known touch sensing technologies may be utilized to provide touch-sensitivity at either the touch sensing region 330. By way of example, touch sensors used with the touch sensing region 330 can utilize resistive touch sensors; capacitive touch sensors (using self and/or mutual capacitance); inductive touch sensors; and/or infrared touch sensors.

For example, touch sensing region 330 can be employed using infrared sensors, which can detect an object contacting the surface of the display screen 320 when the presence of the object "cuts off" or otherwise interferes with an infrared beam being transmitted across the touch sensing region 330. In a variation, the touch sensing region 330 can be implemented using a grid pattern of electrical elements which can detect capacitance inherent in human skin. For example, the touch sensing region 330 can be implemented using a grid pattern of electrical elements which are placed over or just beneath the surface of the display screen 320, and which deform sufficiently on contact to detect touch from an object such as a finger. In another variation, the touch-sensing region 330 can be employed using resistive sensors, which can respond to pressure applied to the surface of the display screen 320. More generally, touch-sensing technologies for implementing the touch sensing region 330 can employ resistive touch sensors, capacitive touch sensors (using self and/or mutual capacitance), inductive touch sensors, and/or infrared sensors.

For some embodiments, e-reading device 300 may detect the presence of an extraneous object 301 (e.g., such as water, dirt, or debris) on the touch sensing region 330 of the display screen 320. For example, the e-reading device 300 may determine that the extraneous object 301 is present on the display screen 320 if a plurality of separate and distinct interactions are concurrently detected via the touch sensing region 330 and persist for at least a threshold duration. More specifically, upon detecting the extraneous object 301 on the surface of the display screen 320, the e-reading device 300 may subsequently operate in a splash mode, wherein one or more device settings are adjusted and/or reconfigured to mitigate or overcome the presence of the extraneous object 301 on the surface of the display screen 320.

In a particular example, while operating in the splash mode, the e-reading device 300 may interpret tap-and-release gestures as page turn inputs. For example, it should be noted that the extraneous object 301 is in persistent contact with the touch sensing region 330. Thus, in order to distinguish the contact made by the extraneous object 301 from actual user interactions (e.g., gestures), the e-reading device 300 may filter out or ignore any detected interactions involving persistent contact with the touch sensing region 330. More specifically, the e-reading device 300 may ignore the initial contact associated with a user interaction, instead triggering a response only after detecting a contact separation or release (e.g., corresponding with a user lifting a finger off the surface of the display screen 320).

With reference to FIG. 3A, a tap-and-release gesture 305 is initiated when a user touches a finger or object to (e.g., or otherwise makes contact with) the touch sensing region 330 of the display screen 320. At this time, the e-reading device 300 may register the initial contact 305(1) associated with the tap-and-release gesture, but does not yet interpret the contact 305(1) as a user input. For example, to the e-reader device 300, the initial contact 305(1) may be indistinguishable from contact by extraneous objects (e.g., such as extraneous object 301).

With reference to FIG. 3B, the tap-and-release gesture 305 is completed when the user release the finger or object from the touch sensing region 330 of the display screen 320. At this time, the e-reading device 300 may interpret the subsequent contact separation 305(2) as a particular user input (e.g., corresponding to a page turn). For example, the contact separation 305(2) helps distinguish the tap-and-release gesture 305 from contact by extraneous objects (e.g., which may be characterized by their persistent contact with the touch sensing region 330).

Figure 4:
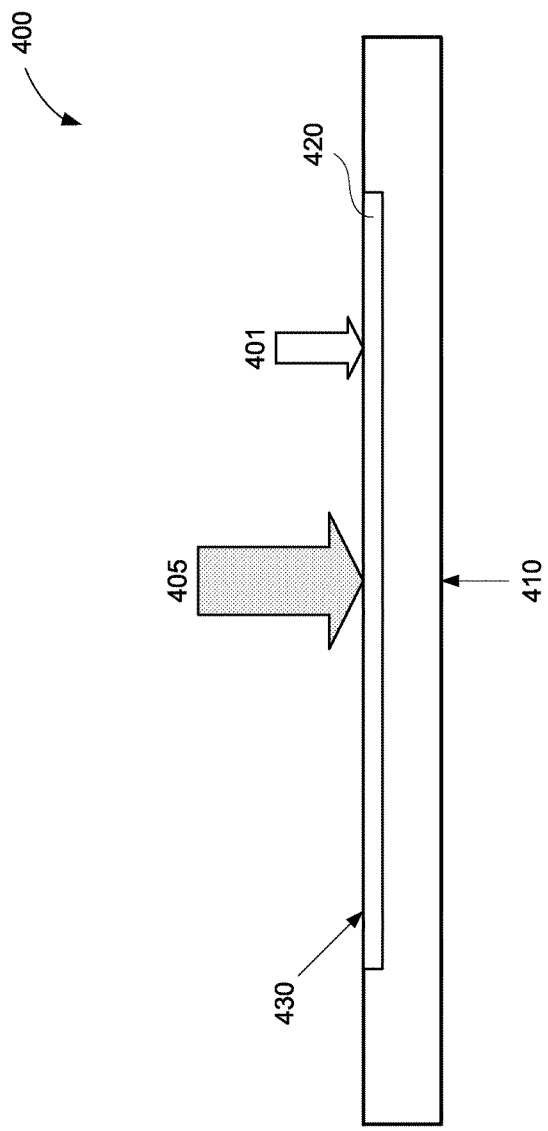
FIG. 4 illustrates an embodiment of an e-reading device operable in a splash mode when water and/or other extraneous objects are present on the display, in accordance with another embodiment.

FIG. 4 illustrates an embodiment of an e-reading device operable in a splash mode when water and/or other extraneous objects are present on the display, in accordance with another embodiment. The e-reading device 400 includes a housing 410 and a display screen 420. The display screen 420 can be part of a display assembly, and can be touch sensitive. A touch sensing region 430 is provided with at least a portion of the display screen 420. Specifically, the touch sensing region 430 may coincide with the integration of touch-sensors with the display screen 420. For simplicity, it may be assumed that the housing 410, display screen 420, and touch sensing region 430 are functionally similar (if not identical) to the housing 310, display screen 320, and touch sensing region 330, respectively, of FIGS. 3A-3B.

For some embodiments, the e-reading device 400 may detect the presence of an extraneous object 401 (e.g., such as water, dirt, or debris) on the touch sensing region 430 of the display screen 420. For example, the e-reading device 400 may determine that the extraneous object 401 is present on the display screen 420 if a plurality of separate and distinct interactions are concurrently detected via the touch sensing region 430 and persist for at least a threshold duration. More specifically, upon detecting the extraneous object 401 on the surface of the display screen 420, the e-reading device 400 may subsequently operate in a splash mode, whereby one or more device settings are adjusted and/or reconfigured to mitigate or overcome the presence of the extraneous object 401 on the surface of the display screen 420.

In a particular example, while operating the splash mode, the e-reading device 400 may validate a user interaction 405 only if the contact pressure associated with that interaction 405 exceeds a pressure threshold. For example, the touch sensing region 330 may be integrated with one or more pressure sensors to detect and correlate a contact pressure with each object in contact with the touch sensing region 330. The pressure threshold may be a predetermined threshold that is greater than the weight of a typical water droplet (e.g., or small splash) or particle of dirt or debris. It should be noted that the larger the extraneous object 401, the greater the likelihood that a user will notice the extraneous object 401 and remove it from the display screen 420. On the other hand, small droplets of water and/or particles of dirt are more likely to pass undetected by the human eye.

In the example shown, the contact pressure associated with the extraneous object 401 is below the pressure threshold (e.g., as indicated by the smaller arrow). Accordingly, the e-reading device 400 may ignore the contact from the extraneous object 401 when operating in the splash mode. On the other hand, the contact pressure associated with the user interaction 405 is above the pressure threshold (e.g., as indicated by the larger, grayed-out arrow). Thus, the e-reading device 400 may interpret the user interaction 405 as a particular user input. More specifically, in some embodiments, the e-reading device 400 may identify the user interaction 405 as one of many recognized gestures.

Device Reconfiguration Functionality

Figure 5:
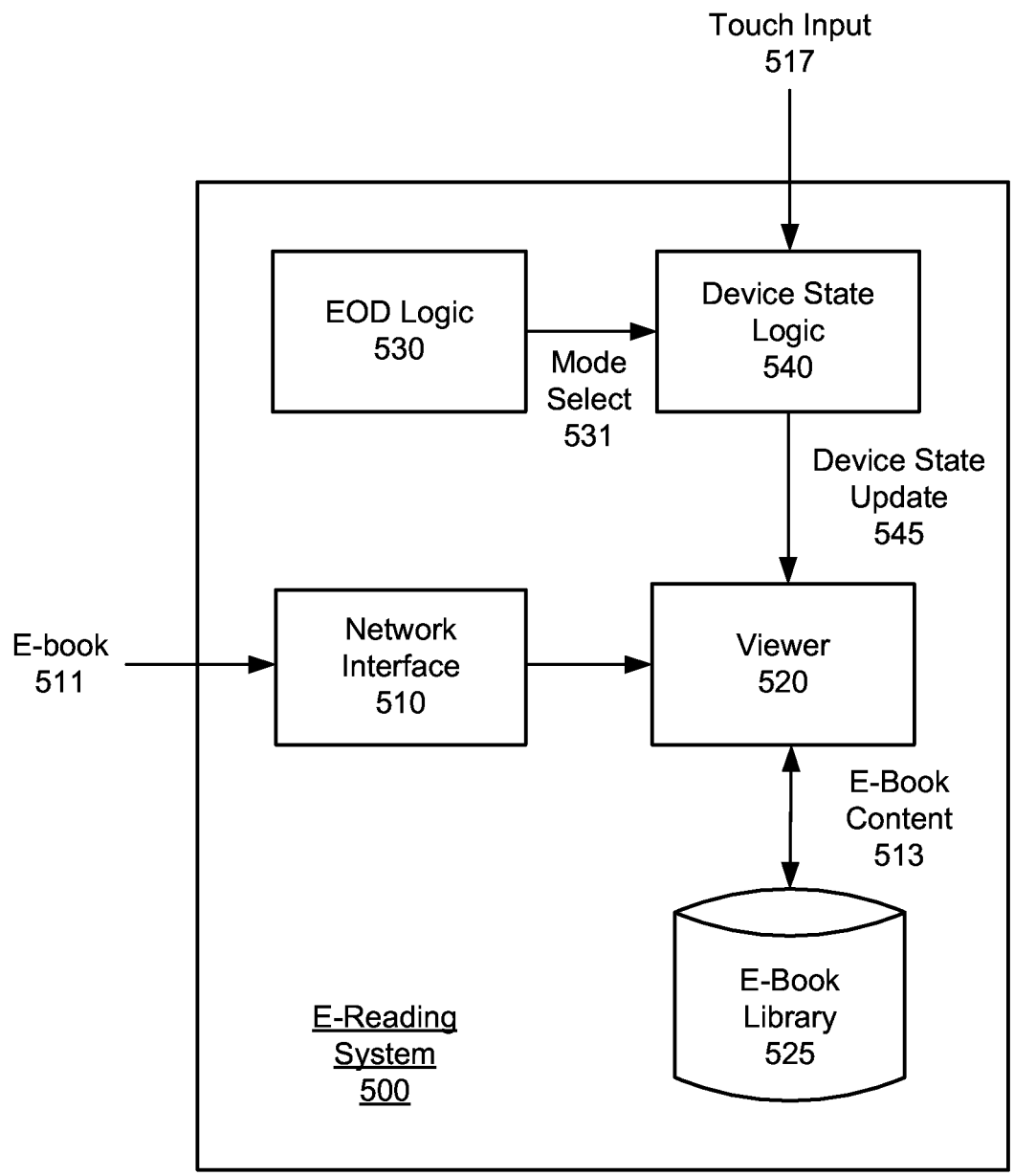
FIG. 5 illustrates an e-reading system for displaying e-book content, according to one or more embodiments.

FIG. 5 illustrates an e-reading system 500 for displaying e-book content, according to one or more embodiments. An e-reading system 500 can be implemented as, for example, an application or device, using components that execute on, for example, an e-reading device such as shown with examples of FIGS. 1, 2, 3A-3B, and 4. Furthermore, an e-reading system 500 such as described can be implemented in a context such as shown by FIG. 1, and configured as described by an example of FIG. 2, FIGS. 3A-3B, and/or FIG. 4.

In an example of FIG. 5, a system 500 includes a network interface 510, a viewer 520, water sensing logic 530, and device state logic 540. As described with an example of FIG. 1, the network interface 510 can correspond to a programmatic component that communicates with a network service in order to receive data and programmatic resources. For example, the network interface 510 can receive an e-book 511 from the network service that the user purchases and/or downloads. E-books 511 can be stored as part of an e-book library 525 with memory resources of an e-reading device (e.g., see memory 250 of e-reading device 200).

The viewer 520 can access e-book content 513 from a selected e-book, provided with the e-book library 525. The e-book content 513 can correspond to one or more pages that comprise the selected e-book. The viewer 520 renders one or more pages on a display screen at a given instance, corresponding to the retrieved e-book content 513. The page state can correspond to a particular page, or set of pages that are displayed at a given moment.

The device state logic 540 can be provided as a feature or functionality of the viewer 520. Alternatively, the device state logic 540 can be provided as a plug-in or as independent functionality from the viewer 520. The device state logic 540 can signal device state updates 545 to the viewer 520. The device state update 545 can cause the viewer 520 to change or alter its current display state. For example, the device state logic 540 may be responsive to touch inputs 517 by signaling device state updates 545 corresponding to page transitions (e.g., single page transition, multi-page transition, or chapter transition).

Further, in specifying the device state update 545, the device state logic 540 can also provide instructions for a device shutoff, display shutoff, and/or screen saver. The device state update 545 for a device shutoff causes the entire system 500, including the viewer 520, to shut down and/or power off. The device state update 545 for a display shutoff causes only the viewer 520 to power off, thus placing the system 500 in a "sleep" mode. Further, the device state update 545 for a screen saver causes a screen saver to be displayed on the viewer 520. It should be noted that other device state updates 545 may also be provided such as, for example, launching and/or closing a book, application, menu, or sub-menu.

Extraneous object detection (EOD) logic 530 can be provided as a feature or functionality of the device state logic 540. Alternatively, the EOD logic 530 can be provided as a plug-in or as independent functionality from the viewer 540. The EOD logic 530 can detect the presence of water and/or other extraneous objects on the surface of the viewer 520. For some embodiments, the EOD logic 530 may be responsive to touch inputs 517 by selectively outputting a mode select signal 531 to the device state logic 540. For example, the EOD logic 530 may detect the presence of one or more extraneous objects based on a number of touch-based interactions detected via touch sensors provided with the viewer 520 (e.g., and received as touch inputs 517) and/or a contact duration associated with each interaction (e.g., a "magnitude" of each of the touch inputs 517).

For some embodiments, the EOD logic 530 may determine that one or more extraneous objects are present on the surface of the viewer 520 upon receiving a touch input 517 that is not a known input for the e-reading system 500. For other embodiments, the EOD logic 530 may determine that one or more extraneous objects are present on the viewer 520 if the touch input 517 is maintained for a duration longer than a threshold duration. Still further, for some embodiments, the EOD 530 may detect the presence of extraneous objects only if the touch input 517 is not a known input and persists beyond the threshold duration.

The mode select signal 531 instructs the device state logic 540 to operate in a "normal mode" or a "splash mode." For example, the device state logic 540 may operate in the normal mode for as long as the mode select signal 531 is deasserted. However, upon detecting extraneous objects on the surface of the viewer 520, the EOD logic 530 may assert the mode select signal 531 to operate the device state logic 540 in splash mode. For example, assertion of the mode selects signal 531 may cause the device state logic to adjust or reconfigure one or more settings of the e-reading system 500. More specifically, some or all of these adjustments may be carried out by the device state logic 540, for example, by generating corresponding device state updates 545.

For some embodiments, while operating in splash mode, the device state logic 540 may reconfigure one or more actions (e.g., input responses) that are to be performed by the e-reading system 500 in response to subsequent user inputs 517. For other embodiments, while operating in splash mode, the device state logic 540 may reconfigure the set of inputs 517 that can be processed by the e-reading system 500. Still further, for some embodiments, while operating in splash mode, the device state logic 540 may reconfigure a set of gestures that are recognizable by the e-reading system 500.

Methodology

Figure 6:
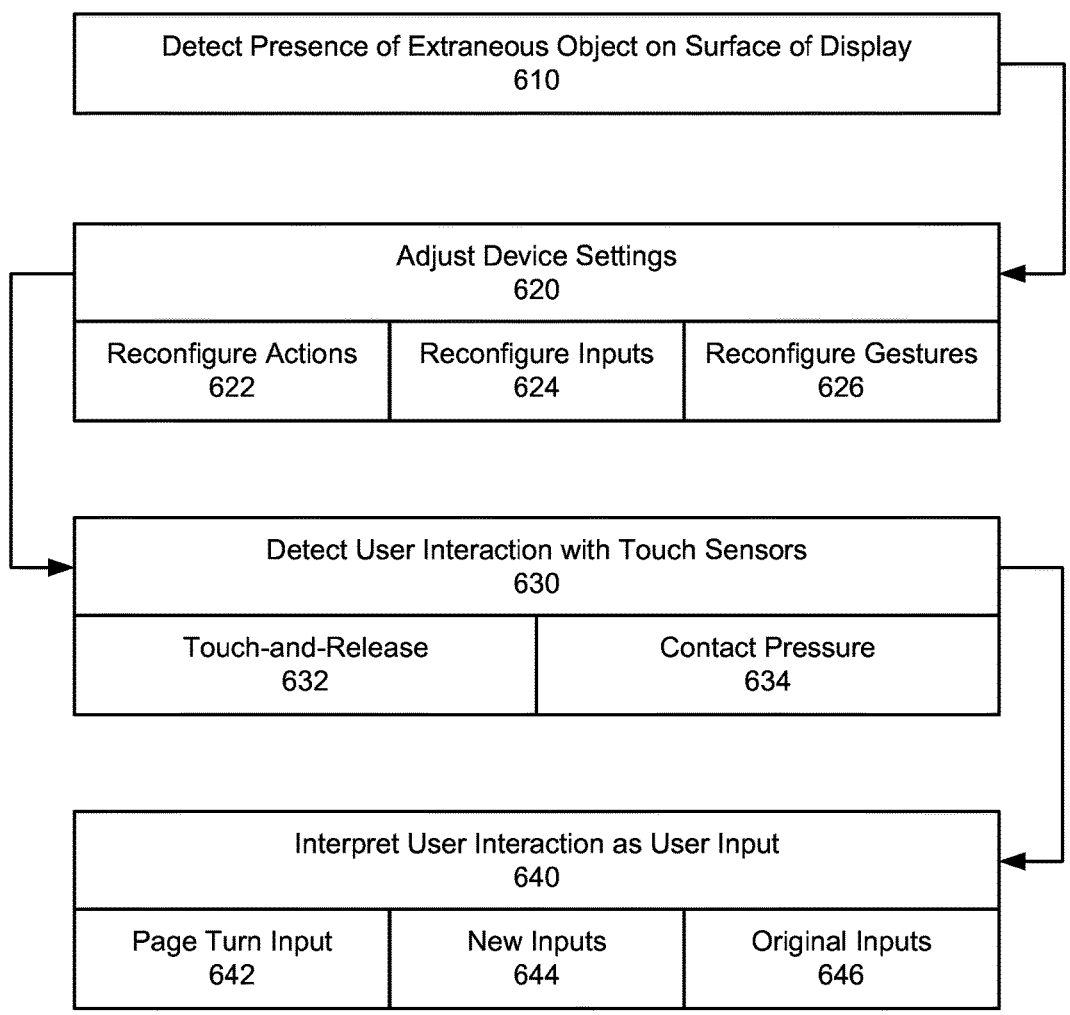
FIG. 6 illustrates a method of operating an e-reading device when water and/or other extraneous objects are present on the display, according to one or more embodiments.

FIG. 6 illustrates a method of operating an e-reading device when water and/or other extraneous objects are present on the display, according to one or more embodiments. In describing an example of FIG. 6, reference may be made to components such as described with FIGS. 2-4 for purposes of illustrating suitable components for performing a step or sub-step being described.

With reference to an example of FIG. 2, the e-reading device 200 may detect the presence of one or more extraneous objects on a surface of the display 230 (610). For some embodiments, the display sensor logic 211 may detect the presence of extraneous objects on the surface of the display 230 based on a number of touch-based interactions detected via the touch sensors 240 and/or a contact duration associated with each of the interactions. For example, the display sensor logic 211 may determine that extraneous objects are present on the surface of the display 230 if a detected interaction falls outside a set of known gestures.

The e-reading device 200 may then adjust one or more device settings after detecting the presence of one or more extraneous objects (630). For example, the splash mode logic 217, may configure the device to operate in splash mode. More specifically, while operating in splash mode, one or more device configurations may be altered or reconfigured to enable the e-reading device 200 to be continuously operable even while the one or more extraneous objects are present on the display surface.

For some embodiments, the splash mode logic 217 may reconfigure one or more actions that are to be performed by the e-reading device 200 in response to user inputs (622). For example, the splash mode logic 217 may disable certain actions that are triggered by multi-contact and/or persistent user interactions. More specifically, while operating in splash mode, the e-reading device 200 may be able to perform only a limited subset of actions that the device 200 would otherwise be able to perform. In a particular implementation, the functionality of the e-reading device 200 may be limited to performing page-turning actions (e.g., multi-page and/or chapter transition inputs may be interpreted by the splash mode logic 217 as single page-turn inputs). Additionally, and/or alternatively, the splash mode logic 217 may enable a new set of actions to be performed by the e-reading device (e.g., designed to enable the e-reading device 200 to operate in an optimized manner while the one or more extraneous objects are present).

For other embodiments, the splash mode logic 217 may reconfigure the set of inputs that can be processed by the e-reading device 200 (624). For example, the splash mode logic 217 may disable certain user inputs that correspond with multi-contact and/or persistent user interactions. More specifically, while operating in splash mode, the e-reading device 200 may respond to only a subset of inputs that the device 200 would otherwise be responsive to. In a particular implementation, the splash mode logic 217 may respond only to page-turn inputs (e.g., inputs corresponding to multi-page and/or chapter transitions may elicit no response from the e-reading device 200).

Further, for some embodiments, the splash mode logic 217 may reconfigure a set of gesture that are recognizable by the e-reading device 200 (626). For example, the splash mode logic 217 may disable certain gestures that could be misinterpreted by the gesture logic 215 given the presence of extraneous objects on the surface of the display 230. More specifically, while operating in splash mode, the e-reading device 200 may recognize only a subset of gestures that the device 200 would otherwise be able to recognize. In a particular implementation, the splash mode logic 217 may only recognize gestures corresponding with a single tap (e.g., tap-and-hold and/or swipe gestures may elicit no response from the e-reading device 200).

After adjusting the device settings, the e-reading device 200 may subsequent detect a user interaction with one or more touch sensors provided with the display 230 (630). For example, the interactions may be detected by the touch sensor components 240. More specifically, the placement of the touch sensor components 240 may coincide with one or more touch sensing regions on the surface of the display 230.

For some embodiments, the touch sensors 240 may be configured to detect a touch-and-release gesture (632). For example, as described above with reference to FIGS. 3A-3B, the e-reading device 300 may recognize a tapping gesture (e.g., as a page-turn input) only after detecting the initial contact 305(1) and subsequent contact separation 305(2). For other embodiments, the touch sensors 240 may be configured to detect a contact pressure association with each user interaction (634). For example, as described above with reference to FIG. 4, the e-reading device 400 may recognize a user input only if the contact pressure associated with the corresponding user interaction (e.g., gesture) exceeds a predetermined pressure threshold.

Finally, the e-reading device 200 may interpret the user interaction as a particular user input (640). For example, the processor 210, in executing the splash mode logic 217 may interpret or otherwise process the detected user interaction based on the adjusted device settings. More specifically, the processor 210 may process the user interaction in a manner that mitigates or overcomes the presence of extraneous objects on the surface of the display 230.

For some embodiments, the processor 210 may interpret the user interaction as a page turn input (642). More specifically, the processor 210 may interpret any user interaction (e.g., regardless of type or gesture) as a page turn input. In other embodiments, the processor may interpret the user interaction as a new input (644). For example, the new input my trigger or otherwise correspond with an action that the e-reading device 200 typically does not perform while operating in the normal mode (e.g., such as notifying the user to the presence of extraneous objects on the surface of the display 230). Still further, for some embodiments, the processor 210 may interpret the user interaction as one of the original inputs (646). For example, if the processor 210, in executing the splash mode logic 217, determines that the contact pressure associated with the user interaction exceeds the pressure threshold, the processor 210 may subsequently interpret the user interaction (e.g., gesture) as one of the original inputs (e.g., page turn, multi-page transition, chapter transition, etc.) recognized by the e-reading device 200.

Although illustrative embodiments have been described in detail herein with reference to the accompanying drawings, variations to specific embodiments and details are encompassed by this disclosure. It is intended that the scope of embodiments described herein be defined by claims and their equivalents. Furthermore, it is contemplated that a particular feature described, either individually or as part of an embodiment, can be combined with other individually described features, or parts of other embodiments. Thus, absence of describing combinations should not preclude the inventor(s) from claiming rights to such combinations.

What is claimed is:

1. A computing device comprising:
a display assembly including a screen;
a housing that at least partially circumvents the screen so that the screen is viewable;
a set of touch sensors provided with the display assembly; and
a processor provided within the housing, the processor configured to:
detect a gesture via the set of touch sensors;
interpret the gesture as one of a plurality of user inputs;
detect a presence of one or more extraneous objects on a surface of the screen of the display assembly; and
adjust one or more settings of the computing device in response to detecting the presence of the one or more extraneous objects by:
reconfiguring the plurality of inputs such that the processor is responsive to only a non-empty subset of user inputs of the plurality of user inputs, and
disabling a first set of gestures that are associated with e-book interaction, wherein the first set of gestures includes at least one of a set of all multi-contact gestures, a set of all tap-and-hold contact gestures, and a set of all swiping contact gestures.

2. The computing device of claim 1, wherein the processor is further configured to adjust the one or more settings by:
reconfiguring a set of actions to be performed in response to the plurality of user inputs.

3. The computing device of claim 1, wherein the subset of user inputs consists of page-turn inputs.

4. The computing device of claim 1, wherein the processor is further configured to adjust the one or more settings by:
reconfiguring a set of gestures recognized by the computing device.

5. The computing device of claim 4, wherein the processor is further configured to reconfigure the set of gestures by:
associating at least one of the plurality of user inputs with a new gesture.

6. The computing device of claim 4, wherein, the processor is further configured to reconfigure the set of gestures by:
disassociating at least one of the plurality of user inputs with a known gesture.

7. The computing device of claim 5, wherein the known gesture corresponds with at least one of: (i) tapping and holding the screen of the display, or (ii) swiping the screen of the display.

8. The computing device of claim 1, wherein the processor is further configured to determine a difference between the gesture and the presence of the one or more extraneous objects by:
determining a contact pressure associated with a contact on a surface of the screen, wherein the contact pressure corresponds with an amount of force applied to a surface of the screen of the display; and
comparing the contact pressure with a pressure threshold.

9. The computing device of claim 8, wherein the processor is further configured to interpret the contact as a gesture when the corresponding contact pressure exceeds the pressure threshold.

10. The computing device of claim 1, wherein the processor is further configured to adjust the one or more settings by enabling a second set of gestures that are associated with the e-book interaction, wherein the second set of gestures is different from the first set of gestures.

11. The computing device of claim 10, wherein the second set of gestures includes a tap-and-release contact.

12. A method for operating a computing device, the method being implemented by one or more processors and comprising:
detecting a gesture with a set of touch sensors provided with a display assembly of the computing device;
interpreting the gesture as one of a plurality of user inputs;
detecting a presence of one or more extraneous objects on a surface of a screen of the display assembly; and
adjusting one or more settings of the computing device in response to detecting the presence of the one or more extraneous objects by:
reconfiguring the plurality of inputs such that the processor is responsive to only a non-empty subset of user inputs of the plurality of user inputs, and disabling a first set of gestures that are associated with e-book interaction, wherein the first set of gestures includes at least one of a set of all multi-contact gestures, a set of all tap-and-hold contact gestures, and a set of all swiping contact gestures.

13. The method of claim 12, wherein adjusting the one or more settings comprises:
reconfiguring a set of actions to be performed in response to the plurality of user inputs.

14. The method of claim 12, wherein the subset of user inputs consists of page-turn inputs.

15. The method of claim 12, wherein adjusting the one or more settings comprises:
reconfiguring a set of gestures recognized by the computing device.

16. The method of claim 15, wherein reconfiguring the set of gestures comprises:
associating at least one of the plurality of user inputs with a new gesture.

17. The method of claim 15, wherein reconfiguring the set of gestures comprises:
disassociating at least one of the plurality of user inputs with a known gesture.

18. The method of claim 12, further comprising:
determine a difference between the gesture and the presence of the one or more extraneous objects by:
determining a contact pressure associated with a contact on a surface of the screen, wherein the contact pressure corresponds with an amount of force applied to a surface of the screen of the display; and
comparing the contact pressure with a pressure threshold.

19. The method of claim 18, wherein interpreting the gesture comprises:
interpreting the contact as a gesture when the corresponding contact pressure exceeds the pressure threshold.

20. A non-transitory computer-readable medium that stores instructions, that when executed by one or more processors, cause the one or more processors to perform operations that include:
detecting a gesture with a set of touch sensors provided with a display assembly of a computing device on which the instructions are executed; and
interpreting the gesture as one of a plurality of user inputs;
detecting a presence of one or more extraneous objects on a surface of a screen of the display assembly; and
adjusting one or more settings of the computing device in response to detecting the presence of the one or more extraneous objects by:
reconfiguring the plurality of inputs such that the processor is responsive to only a non-empty subset of user inputs of the plurality of user inputs, and
disabling a first set of gestures that are associated with e-book interaction, wherein the first set of gestures includes at least one of a set of all multi-contact gestures, a set of all tap-and-hold contact gestures, and a set of all swiping contact gestures.

* * * * *